United States Patent [19]

Lattard et al.

[11] Patent Number: 5,799,035
[45] Date of Patent: Aug. 25, 1998

[54] DIGITAL CIRCUIT FOR DIFFERENTIAL RECEIVER FOR DIRECT SEQUENCE SPREAD SPECTRUM SIGNALS

[75] Inventors: Didier Lattard, Rencurel; Jean René Lequepeys, Fontaine; Bernard Piaget, Venon; Norbert Daniele, Montbonnot, all of France

[73] Assignee: Commissariat a l'Energie Atomique, Paris, France

[21] Appl. No.: 747,262

[22] Filed: Nov. 12, 1996

[30] Foreign Application Priority Data

Dec. 4, 1995 [FR] France .................................. 95 14322

[51] Int. Cl.$^6$ ........................................................ H04K 1/00
[52] U.S. Cl. .......................... 375/206; 375/200; 375/330; 375/331
[58] Field of Search ........................ 375/200, 206, 375/210, 335, 330, 331, 354; 380/34; 370/18, 19; 379/58

[56] References Cited

U.S. PATENT DOCUMENTS 5,202,901  4/1993  Chennakeshu et al. ................. 375/331
5,253,268  10/1993  Omura et al. .
5,311,544  5/1994  Park et al. ............................. 375/206
5,528,624  6/1996  Kaku et al. ............................ 375/206

FOREIGN PATENT DOCUMENTS 3735374  5/1989  Germany .

OTHER PUBLICATIONS

Patent Abstracts of Japan, vol. 95, No. 010, & JP-A-07 283762 (Fujitsu General Ltd.), 27 Oct. 1995.

*Primary Examiner*—Stephen Chin
*Assistant Examiner*—Otto K. Chang
*Attorney, Agent, or Firm*—Pearne, Gordon, McCoy & Gibson LLP

[57] ABSTRACT

The circuit has two parallel channels for the processing of two components in phase (I) and in quadrature (Q). Each channel has filtering means (50(I)) and delay means (60(I)). The circuit also incorporates a multiplication circuit (70), an integration circuit (80) and a programming circuit (90). Several circuits of this type can be connected in cascade.

8 Claims, 4 Drawing Sheets

DIGITAL CIRCUIT FOR DIFFERENTIAL RECEIVER FOR DIRECT SEQUENCE SPREAD SPECTRUM SIGNALS

TECHNICAL FIELD

The present invention relates to a digital circuit for a differential receiver for direct sequence spread spectrum signals.

PRIOR ART

Direct sequence spread spectrum modulation has been used for many years, particularly in radio communications with satellites and in the military sector.

In a digital data transmitter using conventional modulation, the data to be transitted modulate a radio carrier. The modulation used can be phase, frequency or amplitude modulation or a mixed modulation. For simplification purposes, reference will only be made to phase modulations, which are at present the most widely used.

The digital data to be transmitted are bits, which have a period $T_b$, i.e. every $T_b$ it is necessary to transmit a new bit. With these bits, it is possible to form groups of bits, also known as symbols, whose period is designated $T_s$ and is a multiple of $T_b$. These symbols modulate the radio carrier, e.g. in phase.

This procedure can be illustrated by two examples of phase modulation:

a) modulation known as BPSK (Binary Phase Shift Keying) consisting of allocating a phase state, e.g. 0, to the 0 bits and a phase state $\pi$ to the 1 bits, in which case, the symbol is the actual bit and $T_s=T_b$, the radio carrier phase state being imposed on every bit;

b) modulation known as QPSK (Quaternary Phase Shift Keying), which consists of using symbols formed by two successive bits, which can therefore assume four states (00, 01, 10, 11) and a carrier phase state is allocated to each of these states and in this case $T_s=2T_b$ and the phase state of the radio carrier is imposed every two bits.

On the reception side it is necessary to demodulate the signal received, there are two major demodulation families, namely coherent demodulation and non-coherent demodulation. The coherent demodulation procedure consists of forming in the receiver a subassembly having the function of estimating the mean phase of the carrier, so as to reconstitute a phase reference. This phase reference is then mixed with the signal received to demodulate the data.

The non-coherent demodulation procedure is based on the observation that it is sufficient for the phase reference of the symbol taking place to be compared with the phase of the preceding symbol. In this case, instead of estimating the phase of the symbols, the receiver estimates the phase difference between two successive symbols. Thus, there is a differential phase shift modulation or keying DPSK or differential quadrature phase shift modulation or keying DQPSK.

FIGS. 1 to 3 diagrammatically show the structure and operation of a spectrum spread receiver and transmitter operating in DPSK. This prior art corresponds to FR-A-2 712 129.

FIG. 1 shows the block diagram of a transmitter having an input Ee, which receives the data $b_k$ to be transmitted and incorporating a differential coder 10 constituted by a logic circuit 12 and a delay circuit 14. The transmitter also incorporates a pseudorandom sequence generator 30, a multiplexer 32, a local oscillator 16 and a modulator 18 connected to an output Se, which supplies the DPSK signal.

The logic circuit 12 receives the binary data $b_k$ and supplies the binary data $d_k$. The logic circuit 12 also receives the data delayed by one order, namely $d_{k-1}$. The logic operation performed in the circuit 12 is the exclusive-OR operation on the data $b_k$ and the delayed $d_k$ compliment (i.e. on $\overline{d_{k-1}}$:

$$d_k = b_k \oplus \overline{d_{k-1}}$$

The pseudorandom sequence used on transmission for modulating the data must have an autocorrelation function with a marked peak of value N for a zero delay and the lowest possible secondary lobes. This can be obtained by using maximum length sequences (also known as m-sequences) or e.g. so-called GOLD or KASAMI sequences. This pseudorandom sequence $\{C_1\}$ has a binary rate N times higher than that of the binary data to be transmitted. The duration $T_c$ of a bit of this pseudorandom sequence, said bit also being known as a chip, is consequently equal to $T_b/N$.

The chip rate of the pseudorandom sequence can be several million or several tens of millions per second.

FIG. 2 shows the block diagram of a corresponding receiver of the differential demodulator type. This receiver has an input Er and a matched filter 20, whose pulse response is the time reverse of the pseudorandom sequence used in the transmitter, a delay circuit 22 with respect to a duration $T_b$, a multiplier 24, an integrator 26 on a period $T_b$ and a logic decision circuit 28. The receiver has an output Sr restoring the data.

On designating x(t) the signal applied to the input Er, the multiplier 24 receives the filtered signal $x_F(t)$ and the filtered-delayed signal $x_F(t-T_b)$. The product is integrated on a period equal to or lower than $T_b$ in the integrator 26, which delivers a signal whose polarity makes it possible to determine the value of the transmitted bit.

The input filter 20 used in the receiver has a baseband equivalent pulse response H(t) and this response must be the time reverse conjugate complex of the pseudorandom sequence c(t) used on transmission:

$$H(t)=c^*(T_b-t).$$

Thus, the signal delivered by such a filter is:

$$x_F(t)=x(t)*H_F(t)$$

where the sign * designates the convolution operation, i.e.

$$x_F(t) = \int_0^{T_b} x(s) \cdot c^*(s-t)ds.$$

Thus, the matched filter 20 performs the correlation between the signal applied to its input and the pseudorandom spread sequence.

In an additive Gaussian noise channel, the signal $x_F(t)$ will be in the form of a pulse signal, the pulse repeat frequency being $1/T_b$. The envelope of this signal is the autocorrelation function of the signal c(t). The information is carried by the phase difference between two successive correlation peaks. Thus, the multiplier output will be formed by a succession of positive or negative peaks, as a function of the value of the transmitted bit.

In the case of a radio transmission in the presence of multiple paths, the output of the matched filter will be formed by a succession of correlation peaks, each peak corresponding to a propagation path.

The different signals of the reception chain are shown in FIG. 3. Line (a) represents the filtered signal $x_F(t)$, line (b)

the correlation signal $x_F(t)*x_F(t-T_b)$ and line (c) the signal at the integrator output.

The direct sequence spread spectrum modulation procedure is widely described in the specialized literature and reference can e.g. be made to the following works:

"CDMA Principles of Spread Spectrum Communication" by Andrew J. VITERBI, Addison-Wesley Wireless Communications Series;

"Spread Spectrum Communications", by Marvin K. SIMON et al., vol. I, 1983, Computer Science Press;

"Spread Spectrum Systems", by R. C. DIXON, John WILEY and Sons.

This procedure is also described in certain articles:

"Direct sequence Spread Spectrum with DPSK Modulation and Diversity for Indoor Wireless Communications", published by Mohsen KAVEHRAD and Bhaskar RAMAMURTHI in the journal "IEEE Transactions on Communications", vol. COM. 35, No. 2, February 1987;

Practical Surface Acoustic Wave Devices", by Melvin G. HOLLAND, in the journal Proceedings of the IEEE, vol. 62, No. 5, May 1974, pp 582-611.

The direct sequence spread spectrum procedure has the following advantages:

Discretion: This discretion is linked with the spread of the information transmitted on a broad frequency band, leading to a low spectral density of the transmitted power.

Multiple access: Several direct sequence spread spectrum links can share the same frequency band using orthogonal spread pseudorandom sequences (sequences having an inter-correlation function with a very low residual noise for all the shifts). This procedure, known as code multiple access or CDMA is difficult to implement, because it imposes a difficult setting of the transmitted power (a receiver of one link must not be blinded by an adjacent transmitter of another link).

A good cohabitation with conventional narrow band communications: i.e. the same frequency band can be shared by systems using a narrow band modulation and those using a broad band modulation. There is only a slight ambient radio noise increase in the narrow band communications and the longer the sequence the less the noise. Spread spectrum modulation communications have a rejection of narrow band modulations due to the correlation operation performed on reception.

Interception difficulty: A direct sequence spread spectrum transmission is difficult to intercept due to the low spectral density and the fact that the receiver must know the spread sequence in order to be able to modulate the data.

An excellent behaviour in a multipath environment: In such an environment the propagation of the radio wave takes place along multiple paths involving reflection, diffraction and diffusion phenomena. It also not infrequently occurs that there is no longer a time-stable direct path between the transmitter and the receiver. This multipath propagation induces interference effects, which tend to bring about a transmission quality deterioration.

Although this spectrum spread procedure has numerous advantages, it still comes up against difficulties, particularly in the implementation of the receiver and more especially in the performance of the delay and matched filtering functions.

The prior art has proposed numerous solutions. According to a first solution, the matched filtering function is obtained by a method using acoustic sound waves, this being described e.g. in the two following articles:

"Design and experimental results for a direct-sequence spread spectrum radio using differential phase shift keying modulation for wireless communications" by M. KAVEHRAD et al., published in IEEE Journal on SAC, vol. SAC 5, June 1987, pp 815-823;

"Practical Surface Acoustic Wave Devices", by Melvin G. HOLLAND, published in Proceedings of the IEEE, vol. 62, No. 5, May 1974, pp 582-611.

According to another solution a single component fulfils the delay and matched filtering functions and for this purpose:

there is a first correlator ensuring the matched filtering function (correlation between a signal applied to its input and the pseudorandom sequence), there is also a second correlator, whose output signal is delayed by a time equal to the duration of a symbol and in this case the delay is produced by the acoustic wave propagation time along the substrate.

This method is described in FR-A-2 696 298.

However, these solutions still suffer from disadvantages. As the pseudorandom sequence is fixed by the acoustic surface wave component, across the electrodes, it is not possible to change the same, i.e. the component is not programmable. The insertion losses due to this component are very high (approximately 40 dB) and lead to an increased complexity of the amplifier stage. The production costs are high and the manufacturing period is long. The length of the pseudorandom sequence is limited, due to the limited size of the acoustics surface wave component, the limit being at approximately 512 chips.

Recently digital components have appeared permitting the implementation of the delay and matched filtering functions. These circuits are marketed in the form of the STEL 200A circuit of the US company STANDFORD TELECOM or in the form of the S 20043 circuit of the US company AMI.

This digital method is interesting, because it makes it possible to program the matched filter and therefore choose a pseudorandom sequence. Moreover, the insertion losses are very low or even non-existent, which reduces the complexity of the amplifier stage. Finally, the production costs are much lower than with acoustic surface wave components.

However, digital components also suffer from disadvantages, particularly as they have a length limitation with respect to the pseudorandom sequence and due to their operating frequency. As a result of these two limitations the processing gain is limited and the separating power (i.e. the diversity order) of the two paths is relatively low. Thus, these circuits operate at a maximum chip modulation speed of 20 megachips per second. This speed makes it possible to calculate the time difference necessary to permit a distinction between the two paths. This difference is 50 ns corresponding to a distance of 15 m. Knowing that the width of the pulse response within buildings is about 100 ns, it would be possible with such a component to at the most distinguish two paths and thus have a diversity order of only 2.

The object of the present invention is to obviate these disadvantages.

DESCRIPTION OF THE INVENTION

The present invention therefore proposes a circuit making it possible to modify the characteristics associated with the pseudorandom sequence, i.e. essentially its length and definition. The circuit according to the invention is also designed so as to be cascade-connectable. All the circuits of the cascade to a certain extent then behave like a single circuit defining an overall pseudorandom sequence, which is formed by the various sequences placed end to end.

More specifically, the invention relates to a digital circuit for a differential receiver of a direct sequence spread spectrum signal, said signal corresponding to a transmission of a carrier which has been modulated by binary symbols carrying an information, said symbols having been multiplied by a pseudorandom sequence, said circuit being characterized in that it comprises:

a) a first digital processing channel receiving a first part of the signal received, said first part being the part which is in phase with the carrier, said first channel incorporating:

i) first digital means able to fulfil a first filtering function corresponding to a pseudorandom sequence used on transmission, ii) first digital means able to fulfil a first delay function, b) a second digital processing channel receiving a second part of the signal received, said second part being the part which is in phase quadrature with the carrier, said second channel incorporating:

i) second digital means able to fulfil a second filtering function corresponding to said pseudorandom sequence, ii) second digital means able to fulfil a delay function, c) a multiplication circuit having:

two first inputs, one connected to the output of the first digital filtering means and receiving a first filtered signal and the other connected to the output of the first means able to fulfil the delay function and receiving a first filtered-delayed signal, two second inputs, one connected to the output of the second digital filtering means and receiving a second filtered signal and the other connected to the output of the second means able to fulfil the delay function and receiving a second filtered-delayed signal, means for calculating the two direct products between filtered signals and filtered-delayed signals of the first and second channels and the two crossed products between the filtered signal of one channel and the filtered-delayed signal of the other channel, means for calculating the sum of the direct products and the difference of the crossed products, d) an integration and clock regeneration circuit receiving said sum of the direct products and said difference of the crossed products, e) a digital programming means containing informations able to program in particular the first and second filtering means.

The present invention also relates to a circuit comprising a plurality of circuits like that defined hereinbefore, said circuits being connected in cascade. The first circuit (C1) of the cascade receives, on a general input, the first and second parts (I, Q) of the signal received. Each circuit of the cascade which is not at one end of the cascade has its filtering and delay outputs connected to the filtering and delay inputs of the following circuit, each of the filtering means adding to its result by a summating or adding circuit, the result of the filtering means of the preceding circuit and transmitting the sum to the input of the filtering means of the following circuit.

The overall pseudorandom sequence used in such a circuit-cascade receiver is then constituted by all the pseudorandom sequences used in each of the circuits, the last circuit of the cascade being the only one to have its multiplication circuit and its integration and clock regeneration circuit activated, the latter integration circuit then restoring the information on its output.

DETAILED DESCRIPTION OF EMBODIMENTS

Before describing the structure of the circuit according to the invention, certain details will be given on the nature of the processed signals and on the principles of their processing.

Consideration is given to a pulsation carriage w, phase-modulated by a function of the time P(t). The modulated signal can be written:

$$s(t)=A(t) \cos [wt+P(t)]$$

in which A(t) is the amplitude of the signal. This expression can be developed to:

$$s(t)=A(t) \cos wt \cos P(t)-A(t) \sin wt \sin P(t)$$

By using I(t) to designate part A(lt) cos P(t), which is in phase with the carrier and Q(t) the part A(t) sin P(t), which is in quadrature with the carrier, the latter signal can also be written:

$$s(t)=I(t) \cos wt-Q(t) \sin wt$$

It is then appropriate to consider the complex signal S(t):

$$S(t)=U(t) \exp (jwt)$$

with U(t)=I(t)+jQ(t). The true signal s(t) then corresponds to the real part of the complex signal S(t).

Thus, the processing of the signal s(t) can take place by the double processing of the parts I(t) and Q(t), more simply designated hereinafter I and Q.

The processors which process such signals in general receive on two separate inputs the signals I and Q. These signals are obtained by multiplying the reception signal by a wave either in phase with the carrier or in quadrature therewith. The processors then perform various processing operations in accordance with the modulations used. Thus, in the case of differential phase modulation, there are processing operations consisting of forming the sum or the difference of the products of delayed samples, such as e.g.:

$$I_k I_{k-1}+Q_k Q_{k-1} \text{ and}$$

$$Q_k I_{k-1}-I_k Q_{k-1}$$

in which k designates the order of a sample.

Figure 1:
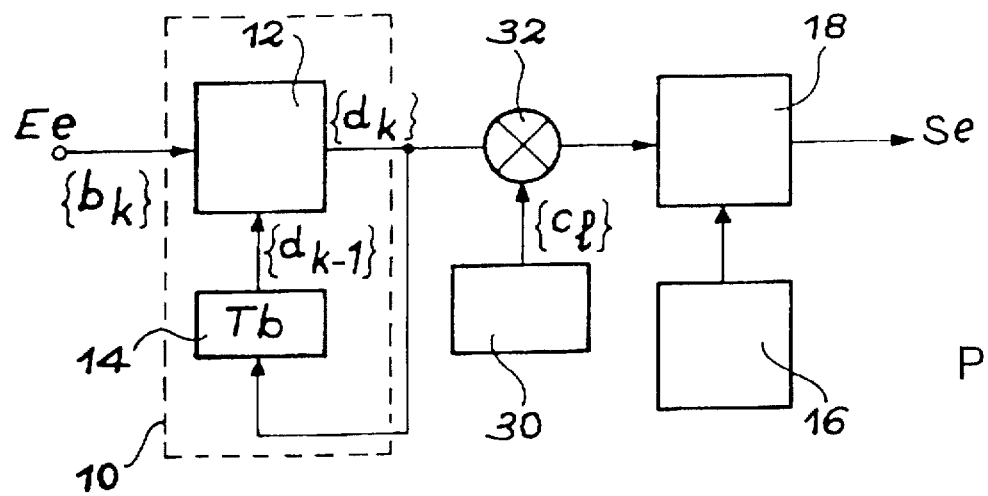
FIG. 1, already described, is a block diagram of a known spread spectrum transmitter.
Figure 2:
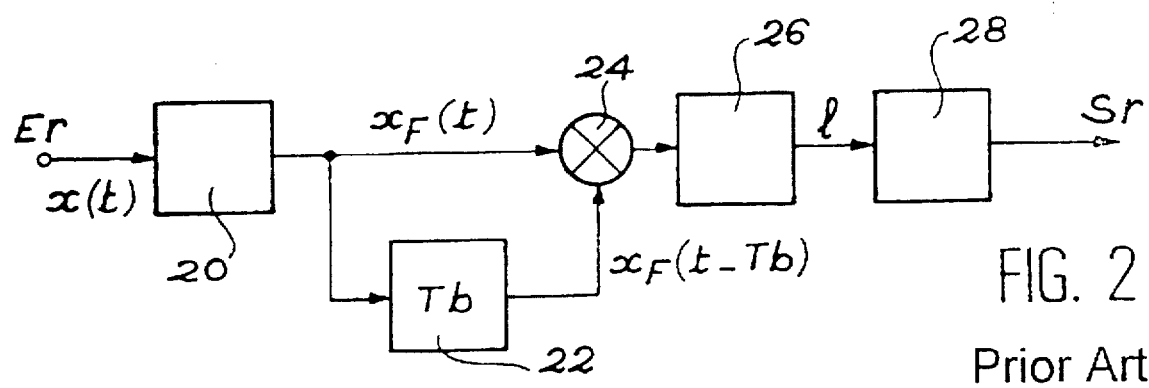
FIG. 2, already described, is a block diagram of a known spread spectrum receiver.
Figure 3:
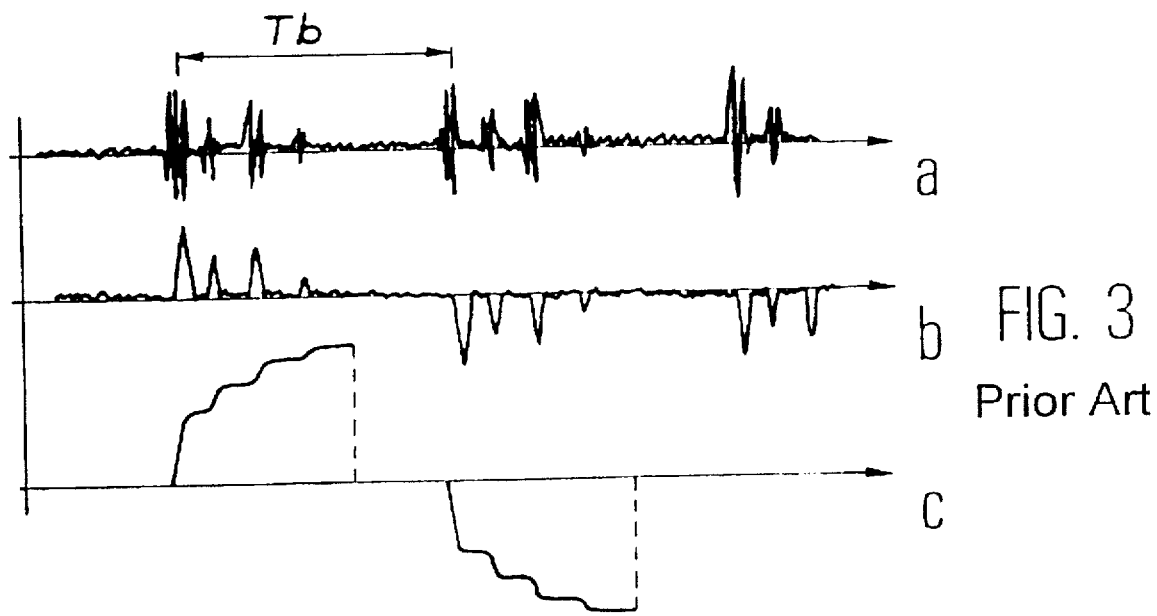
FIG. 3, already described, illustrates the general operation of a receiver.

The first expression is called Dot and the second Cross, so that it is easily possible to show that the product of a sample of order k of the signal s(t), i.e. s(k) by the conjugate prior sample, i.e. s*(k−1), which is calculated in the receiver for demodulating the signal (cf. multiplier 24 in FIG. 2), to within a fixed phase rotation, is of form:

Dot(k)+jCross(k).

The product Dot permits the determination of the phase shift between two successive symbols, whereas the products Dot and Cross taken together permit the determination of the complete number of times π/2 of the phase shift between successive symbols. Thus, these products Dot and Cross permit the correct, unambiguous demodulation when a differential phase modulation is used on transmission.

Thus, a spread spectrum signal receiver firstly forms the in phase and in quadrature parts I and Q, followed by a matched filtering and a correlation on each of these signals. From the samples obtained, the receiver calculates the Dot and Cross signals, and from the latter, restores the information carried by the signal received.

Figure 4:
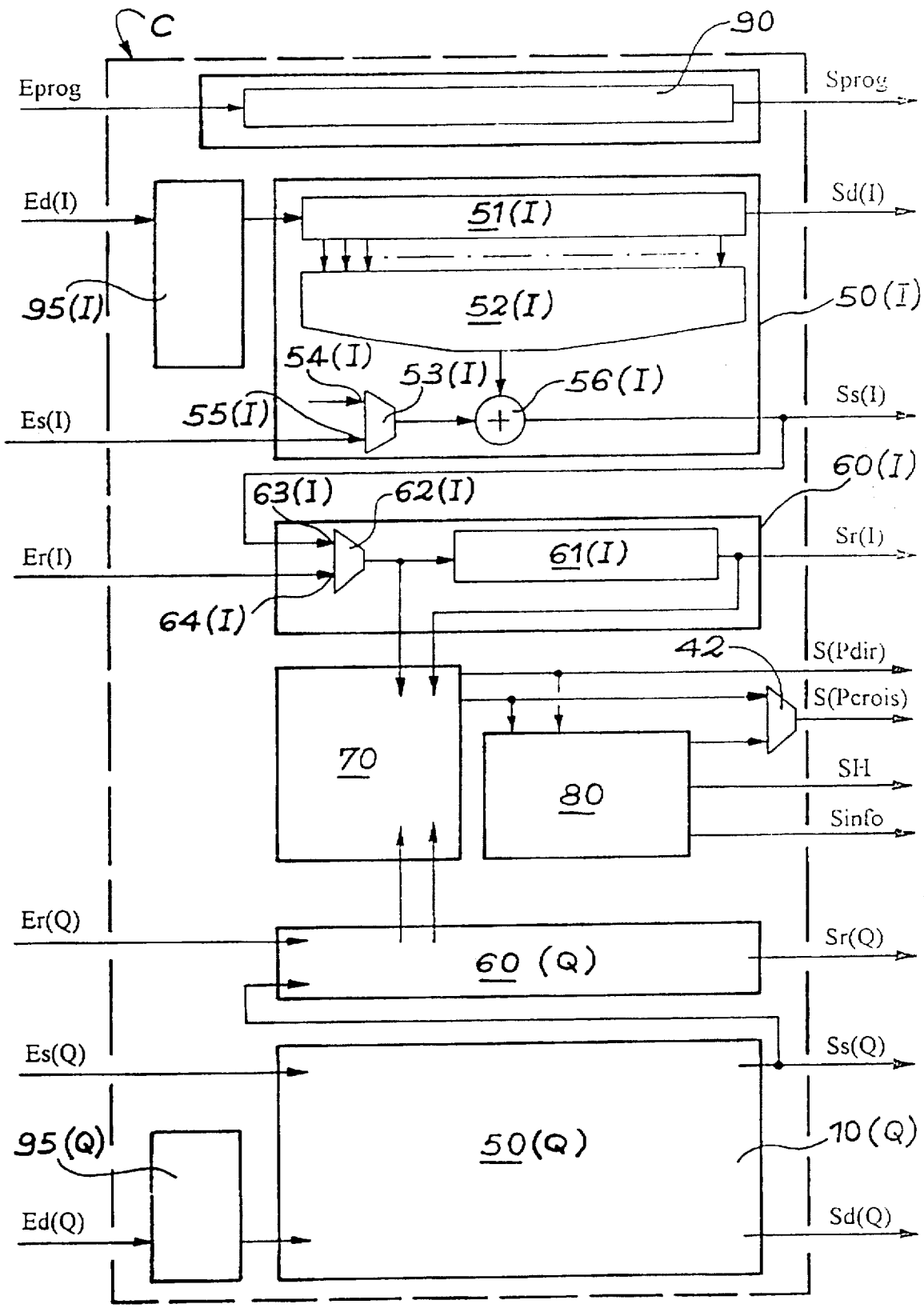
FIG. 4 shows the general structure of a circuit according to the invention.

The general structure of the circuit according to the invention is shown in FIG. 4. This circuit comprises two similar channels, one processing the in phase part I and the other the in quadrature part Q. The references of the means constituting these two channels are followed by I or Q, as a function of whether they belong to the first or second channel. This circuit also has seven inputs, namely three inputs for the channel I (respectively Ed(I), which is a data input and two inputs Es(I) and Er(I), which are respectively filtered and filtered-delayed signal inputs), three inputs for the channel Q (respectively Ed(Q), Es(Q) and Er(Q)) and finally a seventh input Eprog making it possible to enter programming data.

The circuit also has eleven outputs, namely three outputs for the channel I (respectively Sd(I) for the data, Ss(I) for the filtered signal and Sr(I) for the filtered-delayed signal), three outputs for the channel Q (namely Sd(Q), Ss(Q) and Sr(Q)), a direct product or Dot signal output S(Pdir), a Crossed product or Cross signal output S(Pcrois), a clock output SH, an information output Sinfo, and finally a programming output Spro.

When the circuit of FIG. 4 is the only circuit of the receiver, certain inputs are inoperative, such as inputs Es(I), Er(I), Es(Q) and Er(Q), as well as certain outputs such as Spro, Sd(I), Ss(I), Sr(I), Sd(Q), Ss(Q), Sr(Q).

When the circuit is connected in cascade to other similar circuits, the outputs of one are connected to the corresponding inputs of the following circuit, as explained hereinafter relative to FIG. 7.

Apart from the inputs and outputs, the general structure of the circuit is as follows. This circuit firstly comprises a first channel for the digital processing of the part I in phase with the carrier, i.e. data applied to the input Ed(I). This first channel comprises:

i) first digital means 50(I) able to fulfil a first filtering function corresponding to a pseudorandom sequence used on transmission, ii) first digital means 60(I) able to fulfil a first delay function.

The circuit also comprises a second digital processing channel receiving the second part Q of the signal received, said second part being in phase quadrature with the carrier. In practice, this second channel receives the data applied to the input Ed(Q) and comprises, like the first:

i) second digital means able to fulfil a second filtering function corresponding to said pseudorandom sequence, ii) second digital means able to fulfil a delay function.

The circuit in question also has a multiplication circuit 70 incorporating:

two first inputs, one connected to the output of the first digital filtering means 50(I) and receiving a first filtered signal $I_k$ and the other being connected to the output of the first means able to fulfil the delay function 61(I) and receiving a first filtered-delayed signal $I_{k-1}$, two second inputs, one connected to the output of the second digital filtering means 50(Q) and receiving a second filtered signal $Q_k$ and the other connected to the output of the second means able to fulfil the delay function 61(Q) and receiving a second filtered-delayed signal $Q_{k-1}$.

means for calculating the two direct products between the filtered and filtered-delayed signals of the first and second channels, namely $I_k I_{k-1}$ and $Q_k Q_{k-1}$ and the two crossed products between the filtered signal of one channel and the filtered-delayed signal of the other channel, namely $Q_k I_{k-1}$ and $I_k Q_{k-1}$.

means for calculating the sum of the direct products, i.e. $I_k I_{k-1} + Q_k Q_{k-1}$ and the difference of the crossed products, i.e. $Q_k I_{k-1} - I_k Q_{k-1}$.

The circuit of FIG. 4 also comprises an integration and clock regeneration circuit 80 receiving the sum of the direct products and the difference of the crossed products. The circuit of FIG. 4 also comprises a digital programming circuit 90 containing informations able in particular to program the first and second filtering means 50(I), 50(Q).

In the illustrated variant, the first and second digital means 50(I) and 50(Q) able to fulfil the first and second filtering functions, incorporate (only the means of the first channel are shown) a shift register 51(I), an adder-subtractor 52(I), a gate 53(I) having a control input 54(I) and a signal input 55(I) receiving a filtered signal from the input Es(I) and a summating or adding circuit 56(I) having a first input connected to the output of the adder-subtractor 52(I) and a second input connected to the output of the gate 53(I).

In the illustrated variant, the first and second digital means 60(I), 60(Q) able to fulfil the first and second delay functions incorporate (only the means of the first channel being shown) a multiplexer 62(I) with an input connected to the output of the summating or adding circuit 56(I) and another input connected to the delayed signal input Er(I) and a random access memory 61(I) with an input connected to the output of the multiplexer 62(I) and an output Sr(I) supplying a delayed signal.

Preferably, the two channels also have a first and second shaping and summating circuits 90(I), 90(Q) placed respectively in front of the first and second filtering means 50(I), 50(Q).

The digital programming means 90 comprises a shift register having an input Epro and outputs connected to the first and second shift registers of the two channels, also connected to the first and second adder-subtractors 52(I) of the first and second filtering means 50(I), 50(Q), also connected to the first inputs 54(I) of the first and second gates 53(1) of the first and second delay means 60(I), 60(Q) and finally connected to the multiplication means 70 and to the integration means 80.

The circuit of FIG. 4 functions as follows. In very general terms, the informations to be processed are presented to the baseband circuit by the inputs Ed(I) and Ed(Q). The processings are identical on both channels. The blocks 70 and 80 combine the baseband data and construct correlation peaks. They deduct therefrom the binary information corresponding to the message received. The information is available on the output Sinfo. The block 90 intervenes in the configuration of the circuit and makes it possible to fix the different parameters. It has no direct function in data processing.

In a more detailed manner, the block 95 (in other words the block 95(I) for channel I and block 95(Q) for channel Q) is a summator or adder placed at the head of each channel. It permits the taking into account of 1 to 5 samples per chip period. The data taken into account are 4 bit-digitized baseband raw data at a sampling frequency.

The block 50 (respectively 50(I), 50(Q)) makes it possible to perform the matched filtering of the data supplied by the head summator. It incorporates registers for creating an environment able to extend to 128 data items and adder-subtractors for performing the convolution function. Each data item is multiplied by a coefficient of the pseudorandom sequence and all the 128 products obtained are summated. The filtering block, to take account of the cascadable nature of the component, has a supplementary summator 56 (respectively 56(I), 56(Q)) making it possible to recombine the partial result of the preceding neighbouring circuit (by inputs Es(I) and Es(Q)) with its own calculation and transmits the result to the following circuit by outputs Ss(I) and Ss(Q). The informations transiting in these circuits are coded on 8 bits.

The block 60 (respectively 60(I) and 60(Q)) has the function of delaying the matched filtering result. In the case of a single circuit, the informations taken into account are those which come from the adder-substractor. The delay is implemented by means of a random access memory having two inputs, the first input being used in writing (information to be delayed) and the other in reading (information delayed), the difference between the two addresses corresponding to the desired delay. The informations are then transmitted to the multiplication block 70.

Said multiplication 70 performs a complex multiplication between the result of the filtering and the same delayed information. The calculations performed make it possible to obtain a sum of direct products SPD and a difference of crossed products DPC:

$$SPD = I_k I_{k-1} + Q_k Q_{k-1}$$

$$DPC = Q_k I_{k-1} - I_k Q_{k-1}$$

The main operators used for these calculations are four 8 bit multipliers and two adders. The results are reduced to a 10 bit dynamics.

The block 80 permanently scans the data transmitted by the block 70 on the output S(Pdir). It detects and follows the correlation peaks in order to record a clock Hinfo timed to the symbol frequency Ts. It integrates the sum signal of the direct products in a time range centred around the strongest amplitude peak in order to produce the binary data item representing the information, which appears on the output Sinfo.

The configuration of the general circuit is assumed by the block 90. The different parameters, such as the sequence length, the binary coefficient values of the pseudorandom sequence, the cascading of the calculating units, the control of the complete data paths and the integration time are configurable. A shift register of e.g. 253 bits contains the appropriate informations. This register is loaded prior to the use of the circuit. The configuration bits are presented in series by the input Eprog.

Figure 5:
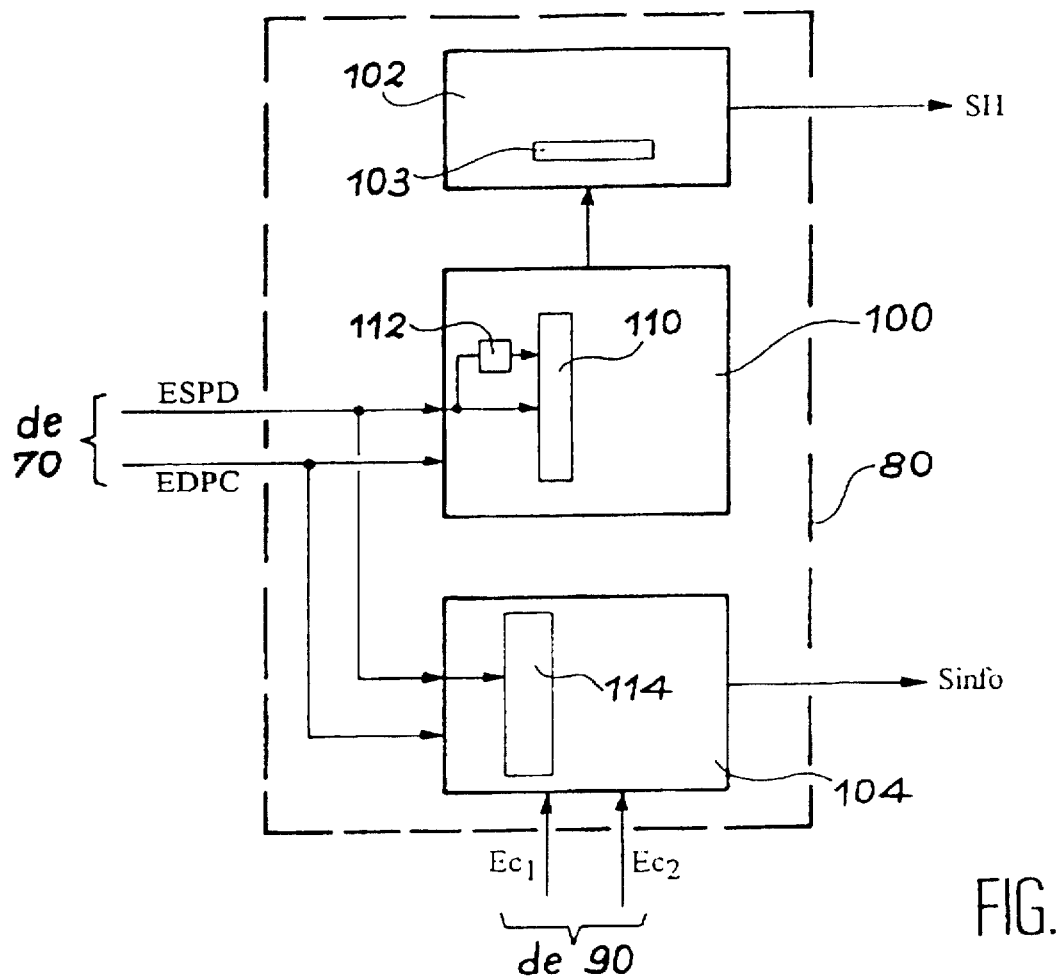
FIG. 5 shows the general structure of the integration and regeneration block of a clock signal.

FIG. 5 shows an embodiment of the integration and clock regeneration circuit 80 incorporating a detection means 100, a clock regeneration means 102 and an integration means 104. The circuit 80 has two first inputs $E_{SPD}$ and $E_{DPC}$ receiving from the circuit 70 respectively the sum of the direct products or Dot and the difference of the crossed products or Cross. The circuit 80 also has two reference inputs, respectively Ec1 and Ec2, which receive from the circuit 90 informations concerning the start of integration and the integration length. The circuit 80 has two outputs, namely SH supplying a clock signal and Sinfo supplying the restored information.

The means 102 essentially comprises a counter 103 incrementing on each chip period (Tc). The minimum counter value is set either to 0, or to 1, or to 2. The capacity of the counter corresponds to the total number of chips in a sequence, in other words to the length of the sequence, i.e. 1 seq. The duration of this sequence is Ts.

When the minimum counter value is fixed at 1, the counter period is precisely Ts, the period of one symbol. The setting of the minimum value different from 1, namely at 0 or 2, makes it possible to increase or decrease the counter period by a chip period, i.e. Tc. When the counter content passes through all the values from 0 to 1 seq, the counter period is equal to Ts+Tc. When the counter content passes from 2 to 1 seq, the period is equal to Ts–Tc. When the counter content passes to the maximum value 1 seq, a signal H passes from 1 to 0 (falling front). When the counter content passes to half the maximum content, i.e. 1 seq/2, the signal H passes from 0 to 1 (rising front).

Figure 6:
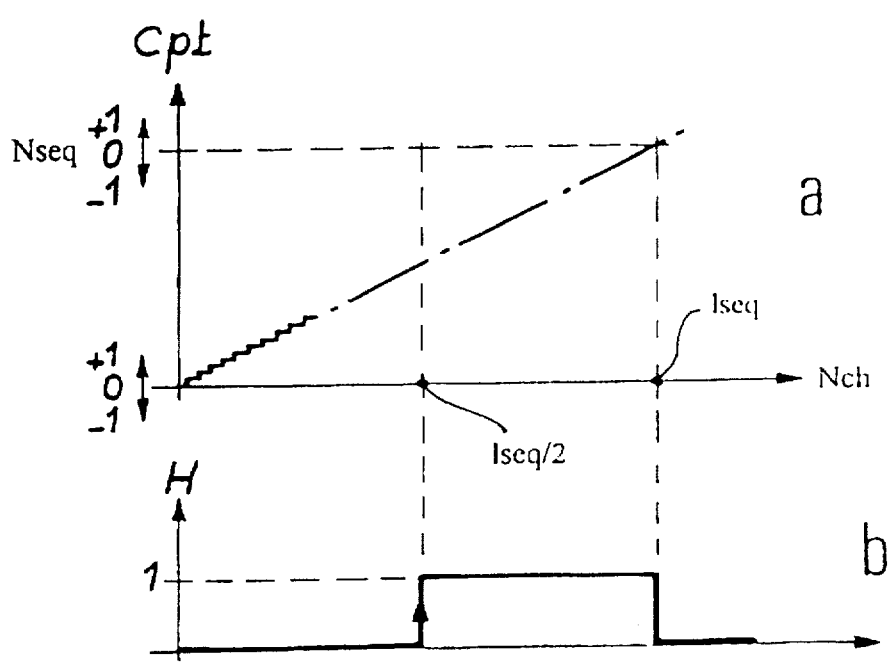
FIG. 6 illustrates the operation of the preceding block.

FIG. 6 illustrates this operation with, at the top, (a) the variation of the counter content as a function of the number of chips received and, at the bottom (b) the clock signal H.

The means 100 make it possible to follow the correlation peak and essentially comprise a comparator 110 and a register 112. The comparator 110 makes it possible to detect a high amplitude peak in a range corresponding to the symbol half-period (Ts/2).

The position of the peak relative to the rising front of the clock signal H will make it possible to set the counter 103 by adding or subtracting 1 with respect to the smallest value of the counter.

As the sliding of the rising front of H with respect to the detected peaks takes place at a rate of one chip period (Tc) per symbol period (Ts), the maximum synchronization time necessary is defined by the product of Ts by the number of chips per half-symbol.

The restoration of the data item takes place by the means 104, which essentially comprises an accumulator 114. Accumulation takes place from the moment where the value of the counter 103 producing the clock H is equal to the signal marking the start of integration (input Ec1). Accumulation is activated when the value of the counter generating the clock H is below the sum of the signals indicating the start of integration and the length of integration (input Ec2). Once accumulation is ended, the sign of the accumulated data item determines the value of the information which will be transmitted on the next rising front of H. If the accumulation result is negative, the information will be equal to 0, otherwise the information supplied will be equal to 1.

A sync signal can indicate that there is synchronization between the high amplitude peaks and the integration range, i.e. that the binary information from the accumulation is significant.

Figure 7:
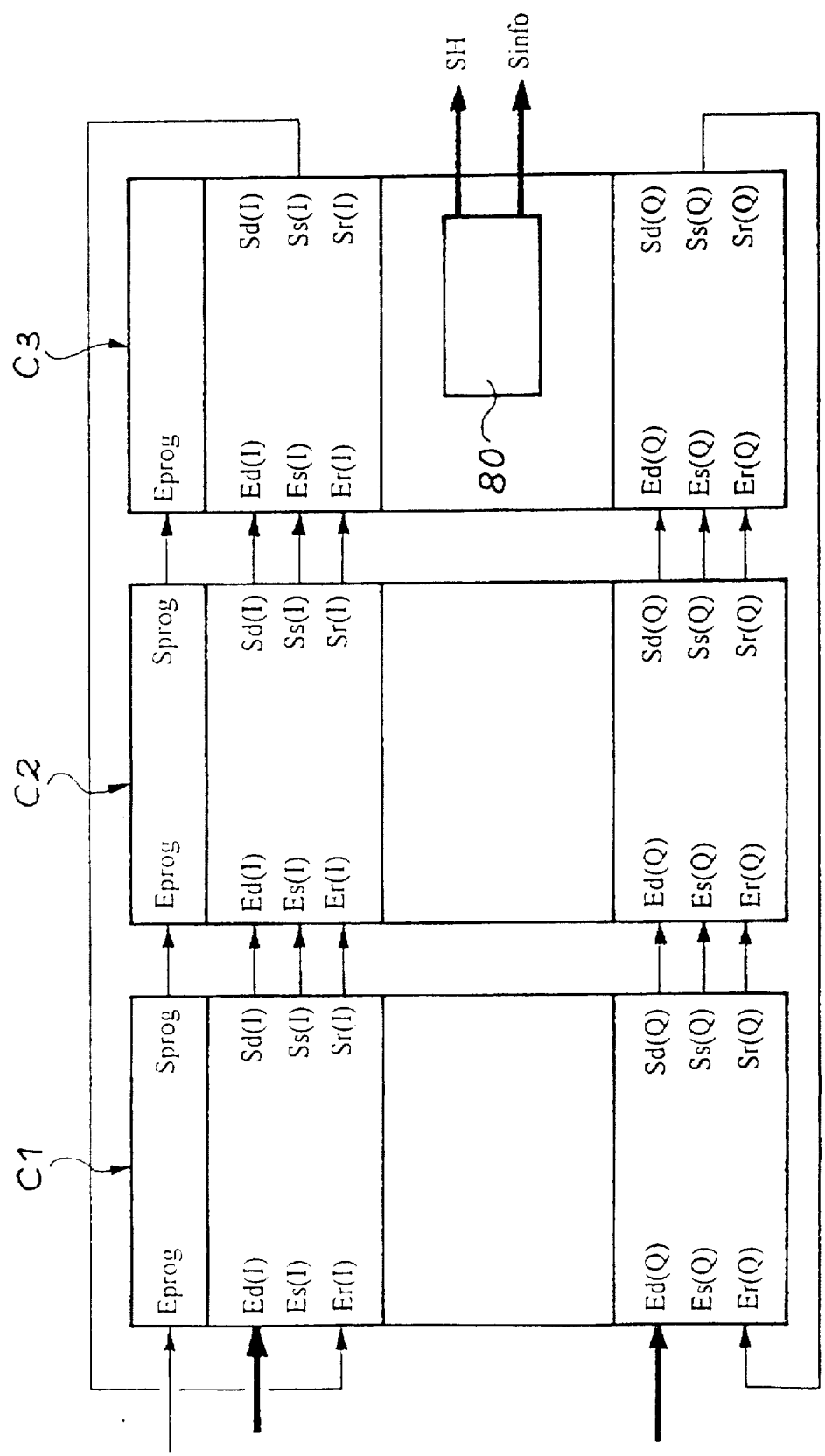
FIG. 7 illustrates a differential receiver incorporating a cascade of circuits, like that of FIG. 4.

FIG. 7 illustrates the case where three identical circuits are connected in cascade, i.e. C1, C2, C3. The inputs of the first circuit C1 receives the data I and Q of the signal by their inputs Ed(I) and Ed(Q). The outputs of this first circuit C1 are directly connected to the corresponding inputs of the second circuit, i.e. C2. In the same way, the outputs of C2 are connected to the corresponding inputs of C3. Only circuit C3 has activated multiplication circuits 70 and integration circuits 80, the other circuits C1 and C2 having their corresponding means inactivated. In the same way, in the circuits C1 and C2, the gate 53 is open, so that chaining takes place between the adder 56 and the output of the filtering means of the preceding circuit. The last circuit C3 is the only one to have the final result concerning filtering. This result appears on the outputs Ss(I) and Ss(Q) and these results are reinjected into the first circuit by the inputs Es(I) and Es(Q). The delay blocks 60 are also chained and form a delay corresponding to all the sequences placed end to end.

With regards to the summating means 95, only the means of the first circuit C1 are used, the other means of the other circuits C2, C3 being transparent. For three circuits, each operating on 128 chips, the entity operates on a sequence of 384 chips (3×128).

Naturally, the invention is not limited to the cascade connection of three circuits, but can instead cover any random number of circuits. It is also not limited to 128 chip sequences, but can instead use sequences of a random length.

We claim:

1. Digital circuit for a differential receiver of a direct sequence spread spectrum signal, said signal corresponding to a transmission of a carrier which has been modulated by binary symbols carrying an information, said symbols having been multiplied by a pseudorandom sequence, said circuit being characterized in that it comprises:
   a) a first digital processing channel receiving a first part (I) of the signal received, said first part being the part which is in phase with the carrier, said first channel incorporating:
      i) first digital means (50(I)) able to fulfil a first filtering function corresponding to a pseudorandom sequence used on transmission,
      ii) first digital means (60(I)) able to fulfil a first delay function,
   b) a second digital processing channel receiving a second part (Q) of the signal received, said second part being the part which is in phase quadrature with the carrier, said second channel incorporating:
      i) second digital means (50(Q)) able to fulfil a second filtering function corresponding to said pseudorandom sequence,
      ii) second digital means (60(Q)) able to fulfil a delay function,
   c) a multiplication circuit (70) having:
      two first inputs, one connected to the output of the first digital filtering means (50(I)) receiving a first filtering signal ($I_k$) and the other connected to the output of the first means able to fulfil the delay function (61(I)) and receiving a first filtered-delayed signal ($I_{k-1}$).
      two second inputs, one connected to the output of the second digital filtering means (50(Q)) and receiving a second filtered signal ($Q_k$) and the other connected to the output of the second means able to fulfil the delay function (61(Q)) and receiving a second filtered-delayed signal,
      means for calculating the two direct products between filtered signals and filtered-delayed signals of the first and second channels ($I_k I_{k-1}$), ($Q_k Q_{k-1}$) and the two crossed products between the filtered signal of one channel and the filtered-delayed signal of the other channel ($Q_k I_{k-1}$), ($I_k Q_{k-1}$)
      means for calculating the sum of the direct products ($I_k I_{k-1} + Q_k Q_{k-1}$) and the difference of the crossed products ($Q_k I_{k-1} - I_k Q_{k-1}$),
   d) an integration and clock regeneration circuit (80) receiving said sum of the direct products and said difference of the crossed products.

2. Circuit according to claim 1, characterized in that it also comprises a digital programming means (90) containing informations able to program in particular the first and second filtering means (50(I), 50(Q)).

3. Circuit according to claim 1, characterized in that the first and second digital means (50(I)) able to fulfil a first and a second filtering functions incorporate a shift register (51(I)), an adder-subtractor (52(I)), a gate (53(I)) having a control input (54(I)) and a signal input (55(I)) receiving a filtered signal and a summating circuit (56(I)) having a first input connected to the output of the adder-subtractor (52(I)) and a second input connected to the output of the gate (53(I)).

4. Circuit according to claim 3, characterized in that the first and second digital means (60(I), 60(Q)) able to fulfil a first and second delay functions incorporate a multiplexer (62(I)) with one input connected to the output of the summating circuit (56(I)) and another input connected to a delayed signal input (Er(I)), and a random access memory (61(I)) having an input connected to the output of the multiplexer (62(I)) and an output (Sr(I)) supplying a delayed signal.

5. Circuit according to claim 1, characterized in that the integration and clock regeneration circuit (80) comprises:
   means (100) incorporating a comparator (110) and a register (112) for following the correlation peaks,
   means (102) incorporating a counter with a capacity equal to the number of chips in the pseudorandom sequence, said counter transmitting a pulse (H) having a rising front when the counter content passes to half the value of the maximum capacity of the counter and a falling front when the counter content passes to the maximum capacity value,
   information restoration means (104) incorporating an accumulator (114) activated as from the integration start time and for a certain period, both being determined by the programming circuit.

6. Circuit according to claim 1, characterized in that it also comprises a first and a second shaping and summating circuits (95(I), 95(Q)) respectively placed in front of the first and second filtering means (50(I), 50(Q)).

7. Circuit according to claim 6, characterized in that the digital programming means (90) comprises a shift register having an input (Epro) and outputs connected to the first and second shift registers (51(I), 51(Q)), the first and second adder-subtractors (52(I), 52(Q)) of the first and second filtering means (50(I), 50(Q)), also connected to the first inputs (54(I), 54(Q)) of the first and second gates (53(I), 53(Q)) of the first and second delay means (60(I), 60(Q)), connected to the multiplication means (70) and to the integration means (80) and finally connected to the first and second shaping and summating means (95(I), 95(Q)).

8. Differential receiver with direct sequence spread spectrum, characterized in that it comprises a cascade of circuits according to any one of the claims 1 to 7, the first circuit (C1) of the cascade receiving, on a general input (Ed(I), Ed(Q)), the first and second parts (I, Q) of the signal received, each circuit of the cascade not at one end of said cascade having its filtering outputs (Ss(I), Ss(Q)) and delay outputs (Sr(I), Sr(Q)) connected to the filtering inputs (Es(I), Es(Q)) and delay inputs (Er(I), Er(Q)) of the following circuit, each of the filtering means (50(I), 50(Q)), adding to its result by the summation circuit (56(I), 56(Q)), the result of the filtering means of the preceding circuit and transmitting the sum to the input of the filtering means of the following circuit, the overall pseudorandom sequence used in such a circuit cascade receiver then being constituted by all the pseudorandom sequences used in each of the circuits (C1, C2, C3), the first circuit of the cascade (C1) being the only one to have its first and second shaping circuits (90(I), 90(Q)) activated, the final circuit of the cascade (C3) being the only one to have its multiplication circuit (70) and its integration and clock regeneration circuit (80) activated and said final integration circuit then restoring the information on its output (Sinfo).

* * * * *